United States Patent [19]
Uno et al.

[11] Patent Number: 4,650,747
[45] Date of Patent: Mar. 17, 1987

[54] PROCESS FOR PRODUCING PHOTOGRAPHIC MASTER BATCH AND PROCESS FOR PRODUCING PHOTOGRAPHIC RESIN COATED PAPER

[75] Inventors: Akira Uno, Matsudo; Akira Ninohira, Funabashi; Touru Noda, Tokyo, all of Japan

[73] Assignee: Mitsubishi Paper Mills, Ltd., Tokyo, Japan

[21] Appl. No.: 654,931

[22] Filed: Sep. 27, 1984

[30] Foreign Application Priority Data

Oct. 3, 1983 [JP] Japan ................... 58-184622

[51] Int. Cl.$^4$ ................................. G03C 1/76
[52] U.S. Cl. ................................. 430/536; 156/244.11; 264/169; 427/391; 523/351
[58] Field of Search ................... 427/391; 156/244.11, 156/244.12; 264/165, 169, 170; 523/351; 430/536

[56] References Cited

U.S. PATENT DOCUMENTS 4,369,267 1/1983 Keung et al. ................. 523/351
4,482,200 4/1984 Asao ................................. 430/536

FOREIGN PATENT DOCUMENTS 649800 10/1962 Canada ......................... 523/531

*Primary Examiner*—John H. Newsome
*Attorney, Agent, or Firm*—Cushman, Darby & Cushman

[57] ABSTRACT

A polyolefin resin composition containing 5 to 150 ppm of an antioxidant and a high-concentration (e.g. 40 to 80% by weight) titanium dioxide pigment is diluted with a polyolefin resin to prepare a medium-concentration (e.g. 20 to 60% by weight) titanium dioxide pigment-containing photographic master batch, then this master batch is further diluted with a polyolefin resin to form a low-concentration (e.g. 5 to 20% by weight) titanium dioxide pigment-containing resin composition, and this resin composition is melt extruded and coated on a support made of paper or a synthetic paper to produce photographic resin coated paper. According to this process, both die lip staining and formation of microgrits are prevented.

16 Claims, No Drawings

PROCESS FOR PRODUCING PHOTOGRAPHIC MASTER BATCH AND PROCESS FOR PRODUCING PHOTOGRAPHIC RESIN COATED PAPER

BACKGROUND OF THE INVENTION (1) Field of the Invention

This invention relates to a process for producing a photographic master batch and a process for producing photographic resin coated paper. (2) Description of the Prior Art Photographic resin coated papers containing a photographic master batch in the resin layer are already known. For instance, U.S. Pat. No. 3,501,298 discloses a photographic resin coated paper made by coating both sides of the support with a resin in which the resin layer on the side applied with a photographic emulsion contains a titanium dioxide pigment, a blue pigment and a fluorescent brightener.

The known processes for producing such photographic resin coated paper, however, are attended by some serious problems. For example, when a resin composition, especially a polyethylene resin composition containing a titanium dioxide pigment is melt extruded in the form of a film from a slit die, the needle- or icicle-like deposits or stains tend to form at the tip of the die lip in a short time or extrusion operation (such deposits or stains being hereinafter referred to simply as die lip stains), and to make the matter worse, such die lip stains tend to grow up rapidly as the melt extrusion is continued.

The die lip stains formed in the course of melt extrusion coating cause the vertical streaks or irregular coating weight due to non-uniform coating rate on the surface of the produced photographic resin coated paper. In some cases, such stains stick to the film to form a contaminant in the coating. Thus, if such stains are left unremoved, the produced resin coated paper is badly impaired in its surface quality and can not be used as a photographic support paper which requires high surface quality.

Also, for perfectly removing the die lip stains in the extruder, there has been no alternative but to clean the die lip by stopping the production line, and a great deal of labor and time has been required for such cleaning. Thus, a prompt solution to this problem has been keenly desired.

Microgrits present another difficult problem in the production of photographic resin coated paper. Microgrits mean here the minute foreign matter or minute irregular grains or particles which come out in the coated resin surface of a photographic resin coated paper made by coating at least one side of a paper or synthetic paper base with a resin composition.

Various causes have been considered for the formation of such microgrits. In the case of the microgrits which are seen on the photographic resin coated paper produced by melt extrusion coating at least one side of a paper or synthetic paper base with a photographic resin by a melt extruder, the following causes are considered: (1) the resin used is of the type which tends to form gels; (2) when the molten resin is extruded into a film from a melt extruder through a die, the proper temperature is not maintained, causing a non-uniform flow of resin; (3) the screen set on the braker plate in the melt extruder is smudged; (4) the barrel liner in the melt extruder is cracked; (5) mixing of the resin composition in the melt extruder is insufficient. These problems may not be so difficult to solve for a skilled engineer.

The most difficult case with the microgrits is when such microgrits are generated on a photographic resin coated paper in which the paper or synthetic paper base is coated with a resin composition consisting of at least a resin and a pigment.

As means for incorporating a pigment in the resin layer, usually a so-called master batch is first prepared by containing a desired pigment in a resin to a certain predetermined concentration and then the batch is diluted with a diluting resin to provide a desired mixing ratio, or a so-called compound is prepared in which a proper pigment is contained in a resin in a desired ratio.

However, when such master batch or compound is prepared by melting and mixing a resin and a pigment by using an ordinary melt mixer, especially a Banbury mixer, kneader or such, the relatively coarse pigment particles tend to be dispersed in the form as they are, without being broken into the fine particles in the resin, allowing the existence of the undispersed pigment particles in the master batch or compound. This gives rise to the microgrits on the resin surface of the photographic resin coated paper in which at least one side of the paper or synthetic paper base is coated with a resin composition consisting of at least a resin and a pigment and produced by using said master batch or compound.

The existence of microgrits in the resin coated paper used as a photographic support causes serious photographic trouble. For instance, when the figure of a person is photographed on a printing paper using a resin coated paper having microgrits as a photographic support, said microgrits might come out at a crucial part such as the face of the photographed person, thus badly spoiling the photograph.

SUMMARY OF THE INVENTION

As a result of more extensive studies for improving these points, the present inventors found that a photographic resin coated paper safe from die lip stain and markedly reduced in the formation of microgrits can be obtained by first preparing a photographic master batch (B) by diluting a resin composition (A) containing 5 to 150 ppm of an antioxidant and a greater amount of an titanium dioxide pigment than in the master batch (B) with a diluting resin so that the titanium dioxide pigment content in the master batch will become lower than that in said composition (A) and higher than that in the resin composition (C) for producing photographic resin coated paper, then further diluting said photographic master batch (B) with a diluting resin to obtain a resin composition (C) for producing photographic resin coated paper, and extrusion coating said resin composition (C) on at least one side of a base made of paper or a synthetic paper. The present invention was attained on the basis of such finding.

DETAILED DESCRIPTION OF THE INVENTION

Hitherto, the titanium dioxide pigment content in the master batch used for photographic resin coated paper has been usually 20 to 40% by weight, and it has been commonly practised to properly dilute this master batch with a diluting resin according to the desired quality of the product photographic resin coated paper to prepare a resin composition with a desired content of titanium dioxide pigment and apply this resin composition on at least one side of a base for photographic resin coated paper. However, in the production of photographic resin coated paper according to such conventional method, socalled die lip stain and formation of microgrits would often take place, resulting in a reduced workability and deteriorated product quality.

According to the present invention, it was disclosed that said die lip stain and formation of microgrits can be markedly reduced when photographic resin coated paper is produced by first preparing a resin composition (A) containing 5 to 150 ppm of an antioxidant and high-concentration (for example 40 to 80% by weight) titanium dioxide pigment (this resin composition (A) may be hereinafter referred to as high-concentration master batch), diluting this resin compositon (A) with a diluting resin to obtain a photographic master batch (B) with a medium concentration (for example 20 to 60% by weight) of titanium dioxide pigment (this master batch (B) may be hereinafter referred to as low-concentration master batch), further diluting this master batch (B) with a diluting resin to obtain a resin composition (C) with a low concentration (for example 5 to 20% by weight) of titanium dioxide pigment, and applying this resin composition (C) on at least one side of a base for photographic resin coated paper.

It is not yet clear why and how said die lip stain and formation of microgrits are strikingly reduced when producing photographic resin coated paper by once diluting a high-concentration master batch containing a specified amount of an antioxidant with a diluting resin to form a low-concentration master batch, then further diluting it with a diluting resin to obtain a corresponding resin composition and extrusion coating said composition on at least one side of a paper base, in comparison with the conventional process where a master batch with approximately 20 to 40% content of titanium dioxide pigment is extrusion coated on at least one side of a paper base, but it is considered that said improvement owes to the certain specific effects provided by the specified amount of antioxidant and a high content of titanium dioxide in the master batch.

A tendency is seen that die lip stain and formation of microgrits become even more likely to take place when an ultramarine is contained in the master batch than when a titanium dioxide pigment alone is contained. In order to produce a so-called bluing effect (a visual effect to emphasize whiteness), it is essential to apply an ultramarine in the resin layer of the photographic resin coated paper, so that the prompt solution to this problem has been desired. The present invention can produce a splendid result especially when applied to a photographic master batch containing an ultramarine, let alone the case where a titanium dioxide pigment alone is contained.

In the present invention, it is possible to use all types of commercially available antioxidants provided that they cause no harmful effect when applied to the photographic resin compositions, but hindered phenolic antioxidants are especially preferred. Examples of such antioxidants are: 1,3,5-trimethyl-2,4,6-tris(3,5-di-tertbutyl-4-hydroxybenzyl)benzene, tetrakis(methylene(3,5-ditert-butyl-4-hydroxy-hydrocinnamate))methane, octadecyl-3,5-di-tert-butyl-4-hydroxy-hydroxinnamate, 2,2′,2″-tris(3,5-di-tert-butyl-4-hydroxyphenyl)propionyloxy)ethyl isocyanurate, 1,3,5-tris(4-tert-butyl-3-hydroxy-2,6-dimethylbenzyl)isocyanurate, tetrakis(2,4-di-tert-butylphenyl)-4,4′-biphenylene-diphosphorous acid esters, 4,4′-thiobis(6-tert-butyl-O-cresol), 2,2′-thiobis-(6-tert-butyl-4-methylphenol), tris(2-methyl-4-hydroxy-5-tert-butylphenyl)-butane, 2,2′-methylene-bis-(4-methyl-6-tert-butylphenyl), 4,4′-methylene-bis-(2,6-di-tert-butylphenol), 4,4′-butylidenebis-(3-methyl-6-tert-butylphenol), 2,6-di-tert-butyl4-methylphenol, 4-hydroxymethyl-2,6-di-tert-butylphenol, and 2,6-di-tert-4-n-butylphenol. It is possible to use two or more antioxidants in combination according to the properties of the antioxidants used. The antioxidant content in said resin composition (A) should be 5 to 150 ppm, preferably 5 to 100 ppm, more preferably 5 to 50 ppm in 100 parts by weight of the composition (A). If the antioxidant content is less than 5 ppm or exceeds 150 ppm, formation of both die lip stains and microgrits is encouraged. As means for containing 5 to 150 ppm of antioxidant in the resin composition (A) in the present invention, it is possible to use a so-called compound made by containing an antioxidant (or antioxidants) in the low-density polyethylene used, or to use a suitable amount of a resin blended with an antioxidant (or antioxidants) to a relatively high concentration. It is also possible to add an antioxidant (or antioxidants) when preparing the resin composition by using a mixer. Further, the above-said methods may be used in suitable combination depending on the type of the antioxidant(s) used.

Any type of commercially available ultramarine can be used in this invention provided that it causes no trouble when applied to the photographic resin compositions. Examples are Bluish Ultramarine No. 8000, No, 4000, No. 3000 and No. 2000, Reddish Ultramarine No. 1900, No. 1500 and No. 300, Worked Ultramarine No. 3000A and No. 1500A, PB-80, DV-1 and DV-2 (products by Daiichi Kasei Kogyo KK). In some cases, cosmetic ultramarines such as CB-80, CR-50, DR-1 and DP-3 can be used. Various types of ultramarine can be used in suitable combination for developing a desired color.

In the present invention, the ultramarine content in the resin composition (A) is preferably in the range of 0.05 to 10 parts by weight per 100 parts by weight of said composition. If the ultramarine content exceeds 10 parts by weight, there take place excess die lip staining and creation of microgrits, while if the ultramarine content is less than 0.05 part by weight, no desired bluing effect is provided.

According to this invention, the pigment content in the high-contentration master batch is preferably 40 to 80 parts by weight and that in the low-concentration master batch is preferably 20 to 60 parts by weight.

The titanium dioxide pigment used in the present invention may be one prepared by either sulfuric acid method or chlorine method, and also such pigment may be either rutile type or anatase type, the latter type being however advantageous in respect of whiteness. It is also possible to use a titanium dioxide pigment which has had no surface treatment, as well as those prepared by applying an inorganic surface treatment such as hydrous aluminum oxide or an organic surface treatment such as a organopolysiloxane or both inorganic and organic surface treatments on the surface of titanium oxide.

As for the resin in the present invention, thermoplastic resins which are capable of melt extrusion coating can be used, among which polyolefin resins are preferred. Low-density polyethylene resins are especially desirable.

The low-density polyethylene resins usable in this invention include those produced by a tank type reactor and those produced by a tube type reactor. Also, those low-density polyethylene resins which were produced by said both types of method can be used in suitable combination. Further, the polyethylene resins with various densities and melt indices (MI) can be used either singly or in admixture. Other types of polyolefin resins such as high-density polyethylene, polypropylene, etc., can be mixed in a suitable amount that will not cause any impediment when the blend is used as a photographic resin composition.

The content of titanium dioxide pigment in the resin layer of photographic resin coated paper using said photographic resin composition according to this invention is preferably in the range of 5 to 40% by weight, most preferably in the range of 7.5 to 25% by weight. Below 5% by weight, no desired hiding power is given to the product used a photographic support. Above 40% by weight, fluidity and other properties of the product are deteriorated.

A fatty acid metal salt may be contained in the resin layer of the photographic resin coated paper according to this invention. Among the fatty acid metal salts usable in this invention are zinc stearate, calcium stearate, aluminum stearate, magnesium stearate, zirconium octylate, sodium palmitate, calcium palmitate and sodium laurate. The amount of such fatty acid metal salt when added should preferably be within the range of 0.01 to 5% by weight based on the resin composition containing titanium dioxide pigment.

The photographic resin composition according to this invention may be added where necessary with a white pigment such as zinc oxide, talc, calcium carbonate, etc., a color pigment such as cobalt blue, cobalt violet, prussian blue, etc., a fluorescent brightener and other additives.

The photographic resin coated paper of this invention containing said photographic resin composition in at least one of the resin layers can be produced by melt extrusion coating the molten resin composition (C) in a filmy state from a slit die onto a usually moving paper or synthetic paper base (hereinafter referred to simply as base paper). Usually the melt extrusion temperature is preferably in the range from 200° C. to 350° C. The base paper is preferably subjected to an activation treatment such as corona discharge treatment or flame treatment before coating it with the resin composition (C). The thickness of resin layers in the resin coated paper is not critical, but usually a thickness of about 5 to 50 microns is perferred. In the ordinary resin coated paper in which both sides of the base paper is resin coated, the resin surface on the front side containing a titanium dioxide pigment is finished into a glossy surface, matte surface, silky surface, etc., according to the purpose of use while the rear side usually has a dull surface, and in such resin coated paper, the front side or if necessary both front and rear sides can be subjected to an activation treatment such as corona discharge treatment or flame treatment.

The base paper used in this invention may be ordinary natural pulp paper or synthetic paper made by using synthetic fiber or synthetic resin film, but natural pulp paper principally composed of wood pulp such as softwood pulp, hardwood pulp or softwood-hardwood mixed pulp is advantageously used. The base paper thickness is not specified, but it is desirable to use a base paper having a good surface smoothness with a basis weight of preferably 50 to 250 g/m$^2$.

The base paper principally composed of natural pulp, which is advantageously used in this invention, may contain various kinds of additives comprising high-molecular compounds. For instance, it may contain a dry paper strength improver such as cationized starch, cationized polyacrylamide, anionized polyacrylamide, carboxy modified polyvinyl alcohol, gelatin, etc., a sizing agent such as fatty acid salts, rosin derivatives, emulsified dialkylketene dimers, petroleum resin emulsions, ammonium salts of styrene-maleic anhydride copolymer alkyl esters, etc., a pigment such as clay, kaolin, calcium carbonate, barium sulfate, titanium oxide, etc., a wet paper strength improver such as melamine resin, urea resin, epoxidized polyamide resin, etc., a fixing agent, for example, a polyvalent metal salt such as aluminum sulfate, aluminum chloride, etc., or a cation modified polymer such as cationized starth, a pH adjuster such as sodium hydroxide, sodium carbonate, hydrochloric acid, etc., an inorganic electrolyte such as common salt, Glauber's salt etc., and other additives such as dye, fluorescent brightener, latex, etc. These additives may be contained in suitable combinations.

In the photographic resin coated paper using the photographic resin composition according to this invention, there can be provided various kinds of photographic emulsion layers of silver halide, for example, an emulsion layer of silver chloride, silver bromide, silver chlorobromide, silver iodobromide, silver chloroiodobromide, etc. It is also possible to provide a multiple photographic silver halide emulsion layers by containing a color coupler in the respective silver halide emulsion layers. As the binder of these silver halide emulsion layers, there can be used gelatin and other hydrophilic high polymeric substances such as polyvinyl pyrrolidone, polyvinyl alcohol, sulfuric acid ester compounds of polysaccharide and the like. Also, various kinds of additives may be contained in said silver halide emulsion layers. For instance, it is possible to contain a sensitizing dye such as cyanine dye, merocyanine dye, etc., a chemical sensitizer such as water-soluble gold compounds, sulfur compounds, etc., an anti-blushing agent or stabilizer such as hydroxy-triazopyrimidine compounds, mercapto-heterocyclic compounds, etc., a hardener such as formalin, vinyl sulfone compounds, aziridine compounds, etc., a coating aid such as benzenesulfonates, sulfosuccinic acid ester salts, etc., a decontaminating agent such as dialkylhydroquinone compounds, a development promoter such as hydroquinone, phenidone, etc., an ultraviolet absorber such as benzotriazole compounds, and other additives such as fluorescent brightener, sharpness improving dye, antistatic agent, pH adjuster and the like. Also, a water-soluble iridium compound, water-soluble rhodium compound or the like may be added at the time of formation and dispersion of silver halide. These additives may be contained in suitable combinations in the silver halide emulsion layers.

On the back side of the photographic resin coated paper of this invention, that is, on the support surface on the side opposite from the side provided with said photographic emulsion layers, mostly the silver halide emulsion layers, there can be provide a coat layer comprising hydrophilic colloids, usually called back coat layer, for the purpose of preventing curling, electric charging, sticking, slipping, etc. In such back coat layer may be contained a binder, protective colloid, hardener, antistatic agent, surfactant, matting agent, latex, etc.

The present invention will be further described below by way of the examples thereof for more detailed explanation of the invention.

EXAMPLE 1

In a low-density polyethylene (density=0.918 g/cm$^3$, MI=8) was contained tetrakis(methylene(3,5-ditert-butyl-4-hydroxy-hydrocinnamate))methane so that the antioxidant (which may hereinafter be referred to as A/O) content would become as shown in Note 1 in Table 1 to prepare A/O blended resin specimens (Specimen No. 1 contains no antioxidant). 15 parts by weight of each of these resin specimens was fed into a Banbury mixer and added with a titanium dioxide pigment, ultramarine and zinc stearate in the amounts (parts by weight) shown in Note 1 in Table 1, and they were mixed well at 150° C. to obtain high-concentration master batches.

Each of these high-concentration master batches was mixed well with equal weight of a low-density polyethylene (density=0.918 g/cm$^3$, MI=8), and the mixture was melt extruded by using a vent extruder, thereby obtaining the low-concentration master batches referred to in Note 2 in Table 1.

Separately from the above, a comparative master batch was prepared by feeding 57.5 parts by weight of the same A/O (50 ppm) blended resin as used in Specimen Nos. 1 to 8 into a Banbury mixer, adding thereto 40 parts by weight of titanium dioxide pigment, 0.5 part by weight of ultramarine and 2 parts by weight of zinc stearate (these three substances being same as used in Specimen Nos. 1 to 8) and mixing them well at 150° C. (This comparative master batch is referred to as Specimen No. 9).

On the other hand, a mixed paper material composed of 50 parts by weight of hardwood bleached kraft pulp and 50 parts by weight of softwood bleached sulfide pulp was beaten to a Canadian standard freeness of 310 ml and then added (to 100 parts by weight of pulp) with 3 parts by weight of cationized starch, 0.2 part by weight of anionized polyacrylamide, 0.4 part by weight (calcd. as ketene dimer) of an alkyl ketene diameter and 0.4 part by weight of polyaminopolyamide epichlorohydrin resin to make a paper web with a basis weight of 160 g/m$^2$. The obtained wet web was dried at 110° C., successively impregnated with a solution composed of 3 parts by weight of a carboxy modified polyvinyl alcohol, 0.05 part by weight of a fluorescent brightener, 0.002 part by weight of a blue dye, 0.2 part by weight of citric acid and 97 parts by weight of water, then dried with hot air at 110° C. and supercalendered under a linear pressure of 90 kg/cm, followed by a corona discharge treatment on both sides to thereby produce a base paper or support for photographic resin coated paper.

Then the back side of the base paper was coated with a 1:1 mixture of a high-density polyethylene (density=0.96 g/cm$^3$, MI=5) and a low-density polyethylene (density=0.92 g/cm$^3$, MI=5) to a thickness of 30 microns by melt extruding said mixture at a resin temperature of 330° C. and coating it with a coater. Then the front side of the base paper was also coated with a resin composition consisting of 25 parts by weight of said low-density master batch (which contains a titanium dioxide pigment, etc.), 30 parts by weight of a high-density polyethylene (density=0.96 g/cm$^3$, MI=5) and 45 parts by weight of a lowdensity polyethylene (density=0.92 g/cm$^3$, MI=5) at a resin temperature of 320° C. to form a 30μ thick coating, thereby producing the polyethylene resin coated papers differing in antioxidant content and containing a titanium dioxide pigment, etc. The front side with the polyethylene coating containing a titanium dioxide pigment, etc., was finished into a completely flat glossy surface while the back side was worked into a matte surface like paper.

The die lip stains (the number of the stains seen on the die lip) and formation of microgrits (the number of the microgrits which formed) as observed when producing the photographic resin coated paper by using said resin compositions differing in antioxidant content and containing a titanium dioxide pigment, etc., are shown in Table 1.

The number of die lip stains and the number of microgrits were determined in the following way. Number of die lip stains:

After 2-hour melt extrusion by using a screw extruder with an extrusion orifice diameter of 65 mm (screw speed=100 r.p.m.) and a melt extruder with a 750 mm wide T-die (melt temperature=320° C.), the number of the stains which appeared on the die lip was counted.

The number of the microgrits produced on the resin surface containing a titanium dioxide pigment, etc., of the photographic resin coated paper made by the method described above was visually counted.

TABLE 1

| Specimen No. | Note (1) High-concentration master batch Contents (parts by wt) in 100 parts by wt of resin composition | | | | Note (2) Low-concentration master batch | Number of stains on die lip | | | Number of microgrits |
|---|---|---|---|---|---|---|---|---|---|
| | TiO$_2$ (parts by weight) | Ultramarine (parts by weight) | Zn—St (parts by weight) | A/O (ppm) | TiO$_2$+ultramarine (parts by weight) | Front side | Back side | Total | produced per m$^2$ |
| 1 | 80 | 1 | 4 | 0 | 40.5 | 10 | 8 | 18 | 12 |
| 2 | 80 | 1 | 4 | 5 | 40.5 | 1 | 0 | 1 | 0.8 |
| 3 | 80 | 1 | 4 | 25 | 40.5 | 1 | 0 | 1 | 0.5 |
| 4 | 80 | 1 | 4 | 50 | 40.5 | 1 | 0 | 1 | 0.7 |
| 5 | 80 | 1 | 4 | 100 | 40.5 | 1 | 1 | 2 | 1.0 |
| 6 | 80 | 1 | 4 | 150 | 40.5 | 2 | 1 | 3 | 1.8 |
| 7 | 80 | 1 | 4 | 500 | 40.5 | 13 | 9 | 22 | 15 |
| 8 | 80 | 1 | 4 | 1000 | 40.5 | 18 | 12 | 30 | 21 |
| 9 | — | | | | 40.5 | 15 | 10 | 25 | 18 |

Note (1)
(1) TiO$_2$: an anatase type titanium dioxide pigment (0.5% by weight calcd. as Al$_2$O$_3$) surface treated with hydrous aluminum oxide.
(2) Ultramarine: Bluish Ultramarine No. 2000 produced by Daiichi Kasei Kogyo KK
(3) Zn—St: zinc stearate
(4) A/O: antioxidant As seen from Table 1, in case a coating resin composition is prepared in two stages, i.e. by diluting a high-concentration master batch in the first stage to prepare a low-concentration master batch and diluting the low-concentration master batch in the second stage, and such resin composition is applied on a support for photographic resin coated paper, both die lip staining and microgrit formation are marvelously prevented when an antioxidant is contained in the high-concentration master batch in an amount of 5 to 150 ppm (Specimen Nos. 2-6). The preventive effect is bettered when the antioxidant content is 5 to 100 ppm, and an even better preventive effect is obtained when the antioxidant content is 5 to 50 ppm.

On the other hand, in the case of the comparative master batch (Specimen No. 9), the one containing no antioxidant (Specimen NO. 1) and those containing an antioxidant in an amount of 500 to 1,000 ppm (Specimen: Nos. 7 and 8), there were observed many die lip stains and mircogrits, and the resulting products were unsuited for use as photographic resin coated paper.

EXAMPLE 2

An A/O blended resin was made by containing 25 ppm of 1,3,5-trimethyl-2,4,6-tris(3,5-di-tert-butyl4-hydroxybenzyl)benzene in a low-density polyethylene (density=0.924, MI=7). Then this A/O blended resin, a titanium dioxide pigment, ultramarine and magnesium stearate were supplied into a Banbury mixer in the amounts shown (by parts by weight) in Note 3 in Table 2 and mixed well at 150° C. to obtain high-concentration master batch specimens.

The thus obtained high-concentration master batch specimens were respectively mixed well with equal weight of a low-density polyethylene (density=0.924 g/cm$^3$, MI=7) and the respective mixtures were melt extruded by using a mixing extruder to obtain low-concentration master batch specimens shown in Note 4 in Table 2.

By using these specimens, photographic resin coated paper was produced in the same way as in Example 1 except that the ratio of low-concentration master batch (MB) to low-density polyethylene (LDPE) in the melt extruded resin composition was as specified in Note 5 in Table 2, and the condition of die lip stains and microgrits in each product was examined. The results are shown in Table 2.

with a low-density polyethylene to form a low-concentration master batch and this low-concentration master batch is further diluted with a low-density polyethylene to obtain a resin composition such as specified in Note 5 in Table 2, and such resin composition is applied on a support for photographic resin coated paper. (See the test results on Specimen Nos. 10–13).

On the other hand, in the case of the specimen made by containing 15 parts by weight of ultramarine in the high-concentration master batch, both die lip stains and microgrits were produced in abundance, and such specimen was unsuited for producing photographic resin coated paper. (See the test results on Specimen No. 14).

EXAMPLE 3

An A/O blended resin was prepared by containing 50 ppm of 4,4'-thiobis-(6-tert-butyl-O-cresol) in a low-density polyethylene (density=0.926 g/cm$^3$, MI=6). Then 14 parts by weight of this A/O blended resin, 80 parts by weight of a titanium dioxide pigment [an anatase type titanium dioxide pigment (1.5% by weight calculated as Al$_2$O$_3$) surface treated with hydrous aluminum oxide], 2 parts by weight of ultramarine (Bluish Ultramarine No. 8000 produced by Daiichi Kasei Kogyo KK) and 4 parts by weight of zinc stearate were put into a Banbury mixer and mixed well at 150° C. to obtain a high-concentration master batch.

Into this high-concentration master batch was added a low-density polyethylene (density=0.926 g/cm$^3$, MI=6) so that the titanium dioxide pigment content would become 60 parts by weight, and they were mixed well and melt extruded by using a vent extruder to obtain a low-concentration master batch (which is hereinafter referred to as blue master batch).

Separately from the above, a high-concentration master batch was prepared according to the same procedure as described above except that no ultramarine was used in the preparation of said master batch, and this high-concentration master batch was diluted with a low-density polyethylene to obtain a low-concentration master batch (which is hereinafter referred to as white master batch).

5 parts by weight of said blue master batch, 10 parts

TABLE 2

| | Note (3) High-concentration master batch Contents (parts by wt) in 100 parts by wt of resin composition | | | | | Note (4) Low-concentration master batch TiO$_2$ + ultramarine (parts by wt) | Note (5) MB to LDPE ratio in resin composition when melt extruded | | Number of stains on die lip | | | Number of micro grits produced per m$^2$ |
|---|---|---|---|---|---|---|---|---|---|---|---|---|
| Specimen No. | Resin (parts by wt) | TiO$_2$ (parts by wt) | Ultramarine (parts by wt) | Mg—St (parts by wt) | A/O (ppm) | | MB (parts by wt) | LDPE (parts by wt) | Front side | Back side | Total | |
| 10 | 58 | 40 | 0.05 | 2 | 25 | 20.0 | 50.0 | 50.0 | 1 | 0 | 1 | 0.6 |
| 11 | 57 | 40 | 1 | 2 | 25 | 20.5 | 48.8 | 51.2 | 1 | 0 | 1 | 0.8 |
| 12 | 53 | 40 | 5 | 2 | 25 | 22.5 | 44.4 | 55.6 | 1 | 1 | 2 | 1.5 |
| 13 | 48 | 40 | 10 | 2 | 25 | 25.0 | 40.0 | 60.0 | 2 | 1 | 3 | 3.2 |
| 14 | 43 | 40 | 15 | 2 | 25 | 27.5 | 36.4 | 63.6 | 8 | 6 | 14 | 19 |

Notes (3) & (4)
(1) TiO$_2$: an anatase type titanium dioxide pigment with no surface treatment
(2) Ultramarine: Reddish Ultramarine No. 1500 produced by Daiichi Kasei Kogyo KK
(3) Mg—St: magnesium stearate
(4) A/O: antioxidant
Note (5)
(1) MB: low-concentration master batch
(2) LDPE: low-density polyethylene (density = 0.918 g/cm$^3$, MI = 5)

As seen from Table 2, formation of both die lip stains and microgrits is strikingly prevented when a high-concentration master batch containing 25 ppm of an antioxidant, 40 parts by weight of a titanium dioxide pigment and 0.05 to 10 parts by weight of ultramarine is diluted by weight of said white master batch, 25 parts by weight of a high-density polyethylene (density=0.96 g/cm$^3$, MI=5) and 60 parts by weight of a low-density polyethylene (density=0.92 g/cm$^3$, MI=5) were mixed well to prepare a resin composition, and this resin composition was applied as a surface layer coating on a support for photographic resin coated paper. Both die lip stains and microgrits were wondrously prevented from being produced and an excellent photographic resin coated paper could be obtained.

EXAMPLE 4

20 Parts by weight of white master batch obtained in Example 3 and 80 parts by weight of a low-density polyethylene (density=0.92 g/cm$^3$, MI=5) were mixed well to form a resin composition (referred to as specimen A) and this resin composition was applied on a support for photographic resin coated paper by using a melt extruder in the same way as in Example 1. Die lip stains and microgrits were examined after the manner of Example 1.

Separately from this, a comparative master batch was prepared in the manner described below by using the same low-density polyethylene as used in specimen A, an antioxidant, a titanium dioxide pigment and zinc stearate. 37 Parts by weight of the low-density polyethylene blended with 37.5 ppm of antioxidant was put into a Banbury mixer, followed by addition thereto of 60 parts by weight of titanium dioxide pigment and 3 parts by weight of zinc stearate and good mixing at 150° C. to obtain a comparative master batch containing a pigment, etc. (referred to as specimen B). Die lip stains and microgrits were examined in the same way as with the specimen A.

Specimen A caused far less die lip stains and microgrits than Specimen B, and it could produce excellent photographic resin coated paper.

On the other hand, specimen B caused many die lip stains and microgrits and was unsuited for the production of photogrpahic resin coated paper.

What is claimed is:

1. A process for producing a photographic master batch which comprises diluting a resin composition (A) containing 5 to 150 ppm of an antioxidant, 0.05 to 10 parts by weight of ultramarine in 100 parts by weight of the resin composition (A) and a greater amount of titanium dioxide pigment than contained in the photographic master batch (B) with a diluting resin so that the titanium dioxide pigment content in the master batch (B) will become lower than that in said composition (A) and higher than that in the resin composition (C) from which photographic resin coated paper is produced.

2. A process according to claim 1, wherein the titanium dioxide pigment content in 100 parts by weight of the resin composition (A) is 40 to 80 parts by weight.

3. A process according to claim 1, wherein the titanium dioxide pigment content in 100 parts by weight of the photographic master batch (B) is 20 to 60 parts by weight.

4. A process according to claim 1, wherein the antioxidant is hindered phenol.

5. A process according to claim 1, wherein the resin used is a polyolefin resin.

6. A photographic master batch obtained according to the process of claim 1.

7. A process for producing a photographic resin coated paper which comprises diluting a resin composition (A) containing 5 to 150 ppm of an antioxidant, 0.05 to 10 parts by weight of ultramarine in 100 parts by weight of the resin composition (A) and a greater amount of titanium dioxide pigment than contained in the photographic master batch (B) with a diluting resin so that the titanium dioxide pigment content in the master batch (B) will become lower than that in said composition (A) and higher than that in the resin composition (C) from which to produce photographic resin coated paper, thereby obtaining a photographic master batch (B), then further diluting said photographic master batch (B) with a diluting resin to obtain a resin composition (C) for producing photographic resin coated paper, and extrusion coating said resin composition (C) on at least one side of a support made of paper or a synthetic paper.

8. A process according to claim 7, wherein the titanium dioxide pigment content in 100 parts by weight of the resin composition (A) is 40 to 80 parts by weight.

9. A process according to claim 7, wherein the titanium dioxide pigment content in 100 parts by weight of the photographic master batch (B) is 20 to 60 parts by weight.

10. A process according to claim 7, wherein the antioxidant is hindered phenol.

11. A process according to claim 7, wherein the titanium dioxide pigment content in 100 parts by weight of the resin composition (C) extrusion-coated on the support made of paper or a synthetic paper is 5 to 20 parts by weight.

12. A process according to claim 7, wherein the resin used is a polyolefin resin.

13. A photographic resin coated paper obtained according to the process of claim 7.

14. A process according to claim 4 wherein the resin used is a polyolefin resin.

15. A photographic master batch obtained according to the process of claim 14.

16. A process according to claim 6 wherein the antioxidant is a hindered phenol and the resin used is a polyolefin resin.

* * * * *